United States Patent
Andrews et al.

(10) Patent No.: US 7,788,992 B2
(45) Date of Patent: Sep. 7, 2010

(54) UNITARY FIBER REINFORCED PLASTIC AERODYNAMIC BICYCLE HANDLEBAR WITH SELECTABLE STEM

(75) Inventors: Mark Andrews, Middleton, WI (US); Brad Addink, Madison, WI (US)

(73) Assignee: Trek Bicycle Corporation, Waterloo, WI (US)

( * ) Notice: Subject to any disclaimer, the term of this patent is extended or adjusted under 35 U.S.C. 154(b) by 725 days.

(21) Appl. No.: 11/427,005

(22) Filed: Jun. 28, 2006

(65) Prior Publication Data

US 2007/0151403 A1    Jul. 5, 2007

Related U.S. Application Data

(63) Continuation-in-part of application No. PCT/US2005/006647, filed on Mar. 1, 2005.

(60) Provisional application No. 60/695,639, filed on Jun. 30, 2005.

(51) Int. Cl.
    *B62K 21/16* (2006.01)
(52) U.S. Cl. ..................................... 74/551.3
(58) Field of Classification Search ..... 74/551.1–551.9; 280/278, 287, 288.4
    See application file for complete search history.

(56) References Cited

U.S. PATENT DOCUMENTS

| | | | |
|---|---|---|---|
| 5,163,339 A * | 11/1992 | Giard et al. ................. | 74/551.3 |
| 5,165,301 A | 11/1992 | Jeshurun et al. | |
| 5,400,676 A * | 3/1995 | Kao ........................... | 74/551.1 |
| 5,624,519 A * | 4/1997 | Nelson et al. ................ | 156/245 |
| 5,782,139 A | 7/1998 | Fraiman | |
| 2004/0060382 A1 | 4/2004 | McColligan et al. | |
| 2005/0109150 A1* | 5/2005 | Chiang et al. .............. | 74/551.1 |
| 2005/0109151 A1* | 5/2005 | Chiang et al. .............. | 74/551.1 |
| 2005/0132839 A1* | 6/2005 | Chen ......................... | 74/551.8 |
| 2005/0268743 A1* | 12/2005 | Meng ........................ | 74/551.8 |

FOREIGN PATENT DOCUMENTS

WO    WO 2005/084316    8/2005

OTHER PUBLICATIONS

Bontrager™ *Carbon Aerobar Owner's Manual* Trek Bicycle Corporation, 5 pages (2004).

* cited by examiner

*Primary Examiner*—Vicky A Johnson
(74) *Attorney, Agent, or Firm*—Ladas & Parry LLP

(57) ABSTRACT

A unitary fiber reinforced plastic aerodynamic bicycle handlebar is molded with a one piece base bar having tubes that slidably receive forward handlebar extensions, the extensions being either locked in place with binder collars, or telescopingly mounted, and either the extensions receiving arm pad brackets or the arm pad brackets being mounted to the base bar, the base bar extending outwardly and terminating in grips, the extensions permitting the rider to assume an aerodynamic position and the grips enabling control while maneuvering, an improved stem permitting a light weight, aerodynamic mounting of the bar to a bicycle.

7 Claims, 7 Drawing Sheets

UNITARY FIBER REINFORCED PLASTIC AERODYNAMIC BICYCLE HANDLEBAR WITH SELECTABLE STEM

RELATED APPLICATIONS

This application claims priority on Provisional Application Ser. No. 60/695,639 filed Jun. 30, 2005, entitled "Unitary Fiber Reinforced Plastic Aerodynamic Bicycle Handlebar" and is also a Continuation in Part of Application No. PCT US 05/006,647 filed Mar. 1, 2005.

BACKGROUND OF THE INVENTION

1. Field of the Invention

Aerodynamic bicycle handlebars optimize structural strength, weight, shape and configuration to enable maximum performance by athletes in demanding conditions. Strength and configuration considerations affect the rider's position on the bicycle and the rider's control of steering and are met in part by having a plurality of handgrips, a pair at the side, and a pair extending forwardly, while enabling mounting of the bar using standard bicycle components. Weight and shape considerations affect the rider's performance because inertia and aerodynamic drag increase the power required to be generated, which power is limited by the athlete's physical ability. Weight and aerodynamic shape are provided by the use of carbon fiber reinforced plastic with an elliptical section in the side portions projecting into the slipstream and the integral forward bar extensions that enable the rider to operate the bicycle while in an aerodynamic "tuck" position. These factors are all interrelated.

2. Description of Related Art

One category of prior art includes aerodynamic shaped or faired handlebars. This prior art includes selected locations for the hand grips to enable the rider to assume an aerodynamic dynamic "tuck" position in combination with various forms of aerodynamic shapes for the bars themselves.

Handlebar extensions and pads for placing the rider in an aerodynamic tuck position also are formed of more traditional circular section tubes, with a variety of mounts to standard handlebars, including clamp-on arrangements bar end fittings. These tubular bars or auxiliary handlebars or handlebar extensions include various configurations and typically also add forearm pads. These are most often for "road" bikes but also include accessories for the typically straighter "mountain" bike bars.

Popular aerodynamic bars or aerodynamic bar extensions include forwardly extended side grips on side of the bar—such as for a track or time trial bar—and a diamond shaped forwardly projecting grip portion either extending from the single piece bar, or clamped to a standard bar, both having forearm pads. Other embodiments show various placements of arm rests and aerodynamic bar extension configurations and modes of attachment.

A variety of aero bars using circular section tubes include a generally triangular form, with drop portions at the sides, with rectangular and various curved tube versions and adaptor kits.

Variations in traditional tubular handlebar configurations provide rider positions having improved aerodynamics—for the rider position. Often these are formed to meet particular competition rules. Additional gripping portions, such as inwardly turning bar ends on traditional "drop" bars are typical.

Forming of composite handlebars is shown in prior art involving injection molding methods and methods that result in an integral neck for connecting to a bicycle's steering "stem".

SUMMARY OF INVENTION

One piece carbon fiber reinforced plastic construction is used to form a base bar. Forwardly facing arm extensions are integrally received in tubular apertures in the base bar, project therethrough and are adjustable on the base bar both front to rear and rotatably. They slide through the tubular apertures in the base bar. The arm extensions will be either carbon or aluminum. Clamps on the base bar mounting tubes will lock the arm extensions in place, in a manner analogous to a seat collar. Arm pad brackets slide on the arm extensions and clamp in place. In general shape, the base bar has a cylindrical center portion that is dimensioned to fit and is received in a standard handlebar stem, a transition portion connects the cylindrical portion to tapered blades that have an elliptical leading and trailing edge. The arm extension receiving tubes are positioned on the cylindrical center portion, just inside the transition from cylindrical to blade shapes. The blades terminate in forward facing cylindrical section, but upwardly curved handles. In their intended use, the rider will extend forwardly with elbows or forearms on the arm pads, holding the arm extensions for an improved aerodynamic posture, when conditions permit, but will use the outer handles where control is important.

Adaptation to utilize a bonded stem mountable on a selected one of the two customary bicycle fork steerer tubes enables a superior aerodynamic shape with improved weight and strength, while having fewer total components. While a particular bar requires a particular stem, for production purposes the unitary fiber reinforced plastic main bar can be made universal and bonded to the stem as needed.

DESCRIPTION OF PREFERRED EMBODIMENTS

Figure 1:
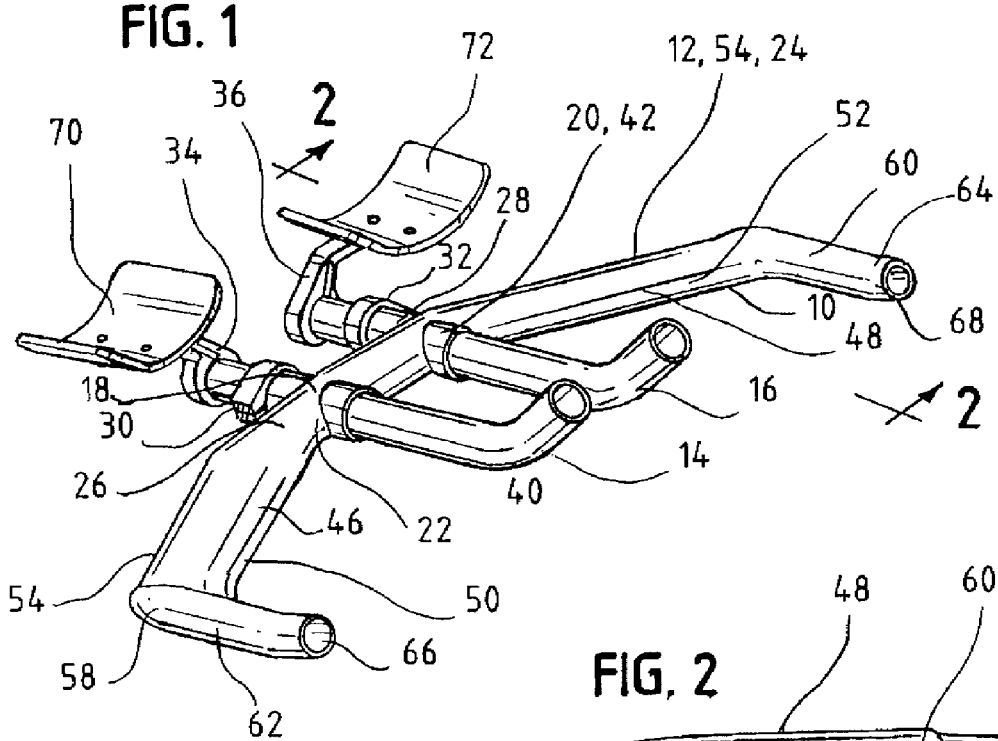
FIG. 1 is a front perspective view of the unitary fiber reinforced plastic aerodynamic bicycle handlebar.

A unitary fiber reinforced plastic aerodynamic bicycle handlebar 10 is formed using carbon fiber reinforced plastic construction to make a base bar 12. Forwardly facing arm extensions 14, 16 are integrally received in tubes 18, 20 in the base bar 12. Extensions 14, 16 project through tubes 18, 20.

Tubes 18, 20 are preferably formed integral with base bar 12 so that they each have a forwardly projecting cylindrical flange 22, 24 and a rearwardly projecting cylindrical flange 26, 28. The interior surfaces of flanges 22, 24, 26, 28 form an interference fit with the outer surfaces of extensions 14, 16, such that extensions slide through the receiving tubes 18, 20 in the base bar 12 and are adjustable on the flanges 22, 24, 26, 28 on base bar 12 both front to rear and rotatably.

The preferable integral molding results in a completely hollow base bar 12. Flanges 22, 24, 26, 28 could be partially slotted to permit compression by binder collars to lock extensions 14, 16 in position. Alternatively, a thinner base bar wall could be used and separate tubes bonded in place, the ends of the separate tubes corresponding to and functioning like flanges 22, 24, 26, 28.

The arm extensions 14, 16 will be preferably formed of either carbon fiber reinforced plastic or aluminum. Other suitable materials could be used, for example, magnesium might be lighter than aluminum, or Kevlar reinforcing fibers might yield more desirable shock absorbing characteristics than all carbon.

Binder collars 30, 32 on the base bar mounting flanges 26, 28 will lock the arm extensions 14, 16 in place, in a manner analogous to a bicycle seat binder collar, by tightening a bolt or "quick release" to compress flanges 14, 16 against the outer walls of extensions 14, 16, providing sufficient friction to lock extensions 14, 16 in place.

Arm pad brackets 34, 36 slide on the arm extensions 14, 16 and clamp in place. Like collars 30, 32 by tightening a bolt or "quick release" to compress flanges 14, 16 against the outer walls of extensions 14, 16, providing sufficient friction to lock brackets in position on extensions 14, 16. The use of separate collars 30, 32 and brackets 34, 36 permits a greater range of adjustment, however it is feasible to integrate the clamping functions of collars 30, 32 with the compression action of brackets 34, 36 in alternative embodiments.

In general shape, the base bar 12 has a cylindrical center portion 40 that is dimensioned to fit and is received in a standard handlebar stem (not shown). Center portion 40 merges into transition portions 42, 44 which connects the cylindrical portion 40 to tapered blades 46, 48. Blades 46, 48 each have an elliptical leading edge 50, 52 and trailing edge 54, 56.

The arm extension receiving tubes 14, 16 are positioned on the cylindrical center portion 40, just inside the transition 42, 44 from cylindrical to blade 46, 48 shapes. The blades 46, 48 terminate in grips 58, 60 which include forward facing cylindrical sections 62, 64 terminating in upwardly curved handles 66, 68. In their intended use, the rider will extend forwardly with elbows or forearms on the arm pads 70, 72, holding the arm extensions 14, 16 for an improved aerodynamic posture, when conditions permit, but will use the outer handles or grips 58, 60 where control is important.

In alternative embodiments, portion 40 could be formed as a separate cylindrical piece, with transition portions 42, 44 bonded thereto. In this manner, the width of the bar 10 could be customized by the use of a standard cylindrical tube of varying length, while blades 46, 48 could be formed in molds that are universal for each side. The only variable would be the length of portion 40. Another alternative would be to join separate blades 46, 48 to a center portion that is molded, in one piece, comprising cylindrical portions 40 and transitions 42, 44. This would enable constant spacing of tubes 18, 20, yet still allow for customized overall bar width.

Figure 4:
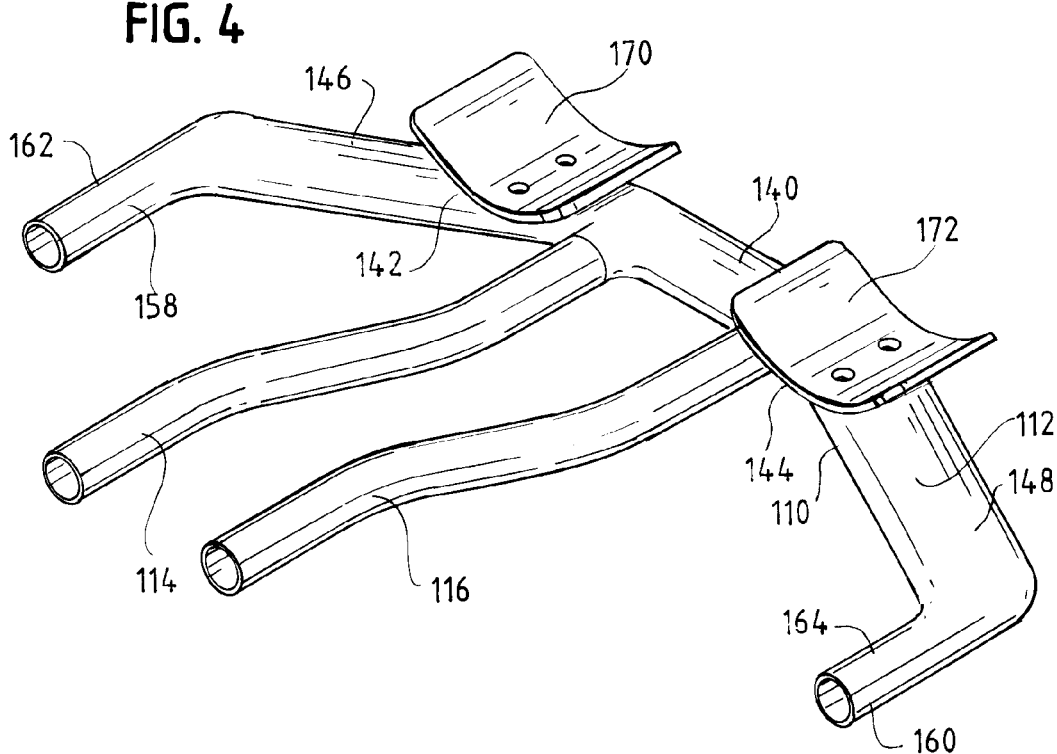
FIG. 4 is a front perspective view of one embodiment of the unitary fiber reinforced plastic aerodynamic bicycle handlebar.
Figure 5:
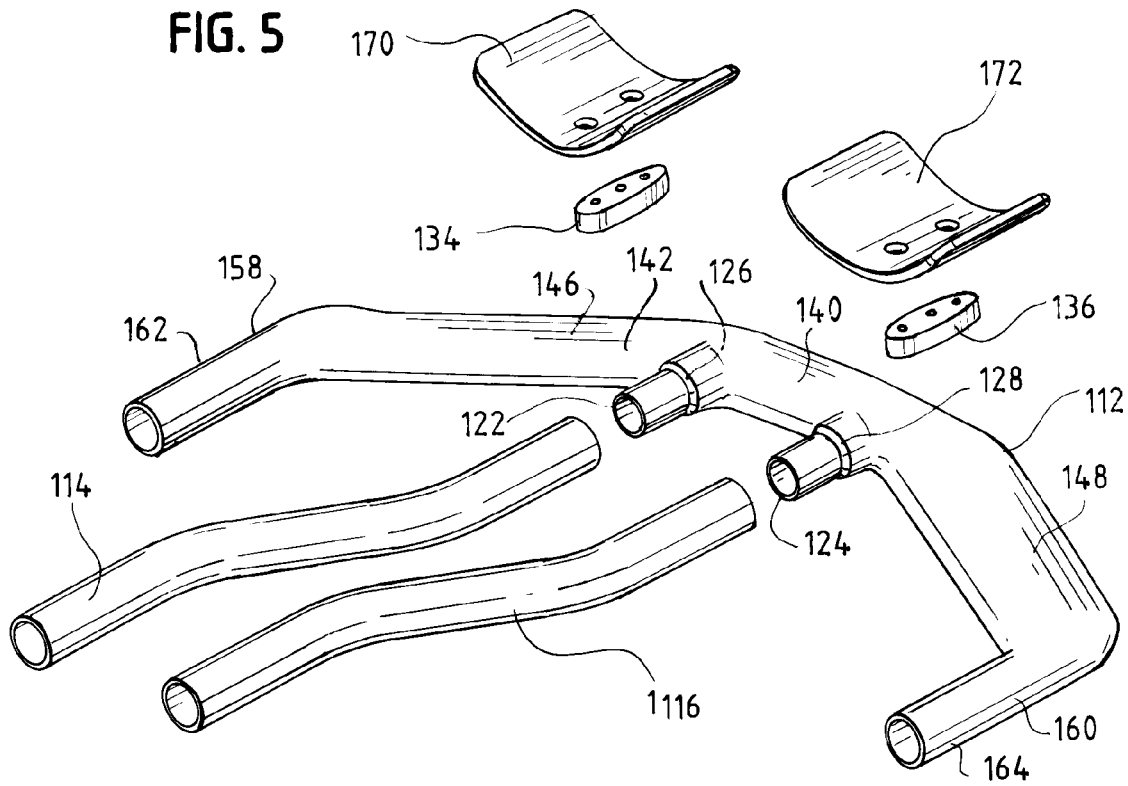
FIG. 5 is an exploded front perspective view of one embodiment of the unitary fiber reinforced plastic aerodynamic bicycle handlebar.
Figure 6:
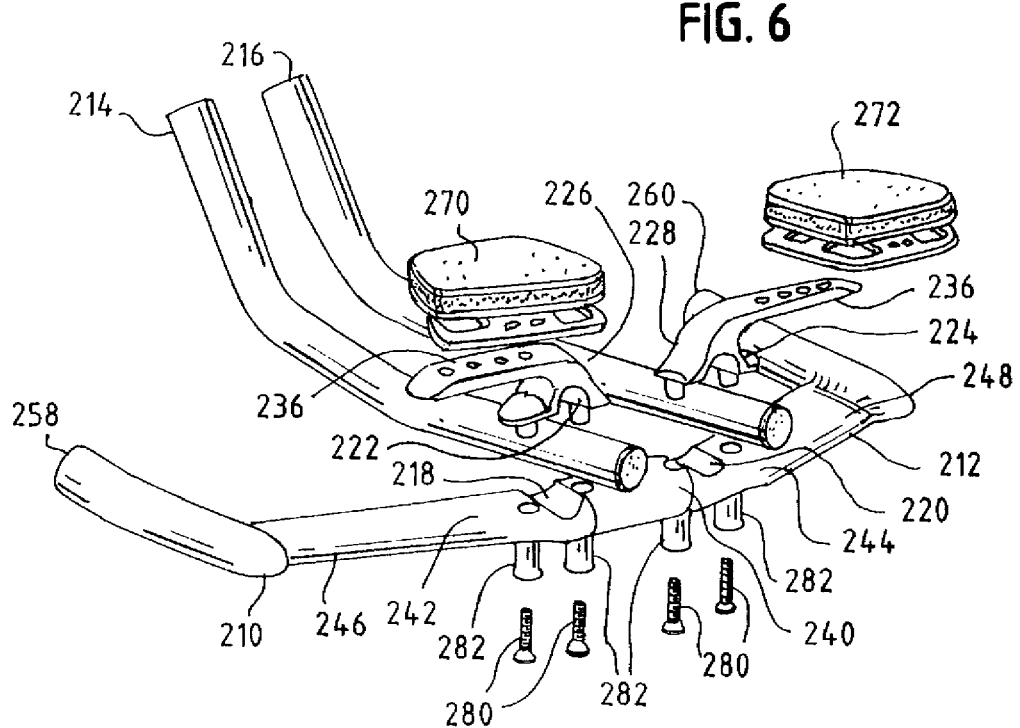
FIG. 6 is an exploded rear perspective view of one embodiment of the unitary fiber reinforced plastic aerodynamic bicycle handlebar.
Figure 7:
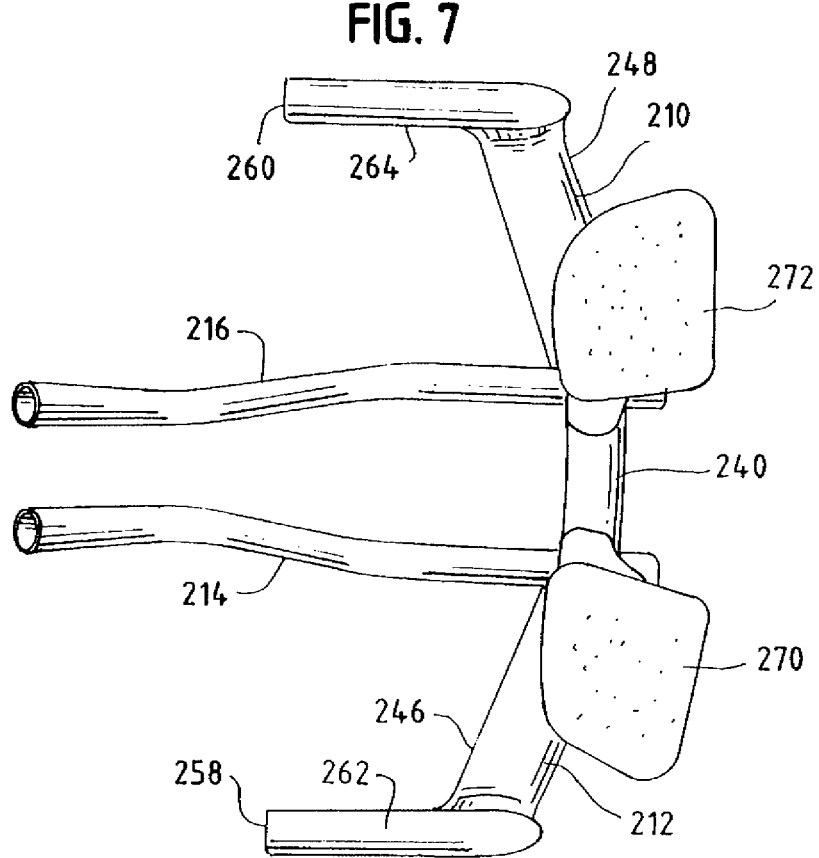
FIG. 7 is a top view of one embodiment of the unitary fiber reinforced plastic aerodynamic bicycle handlebar.
Figure 8:
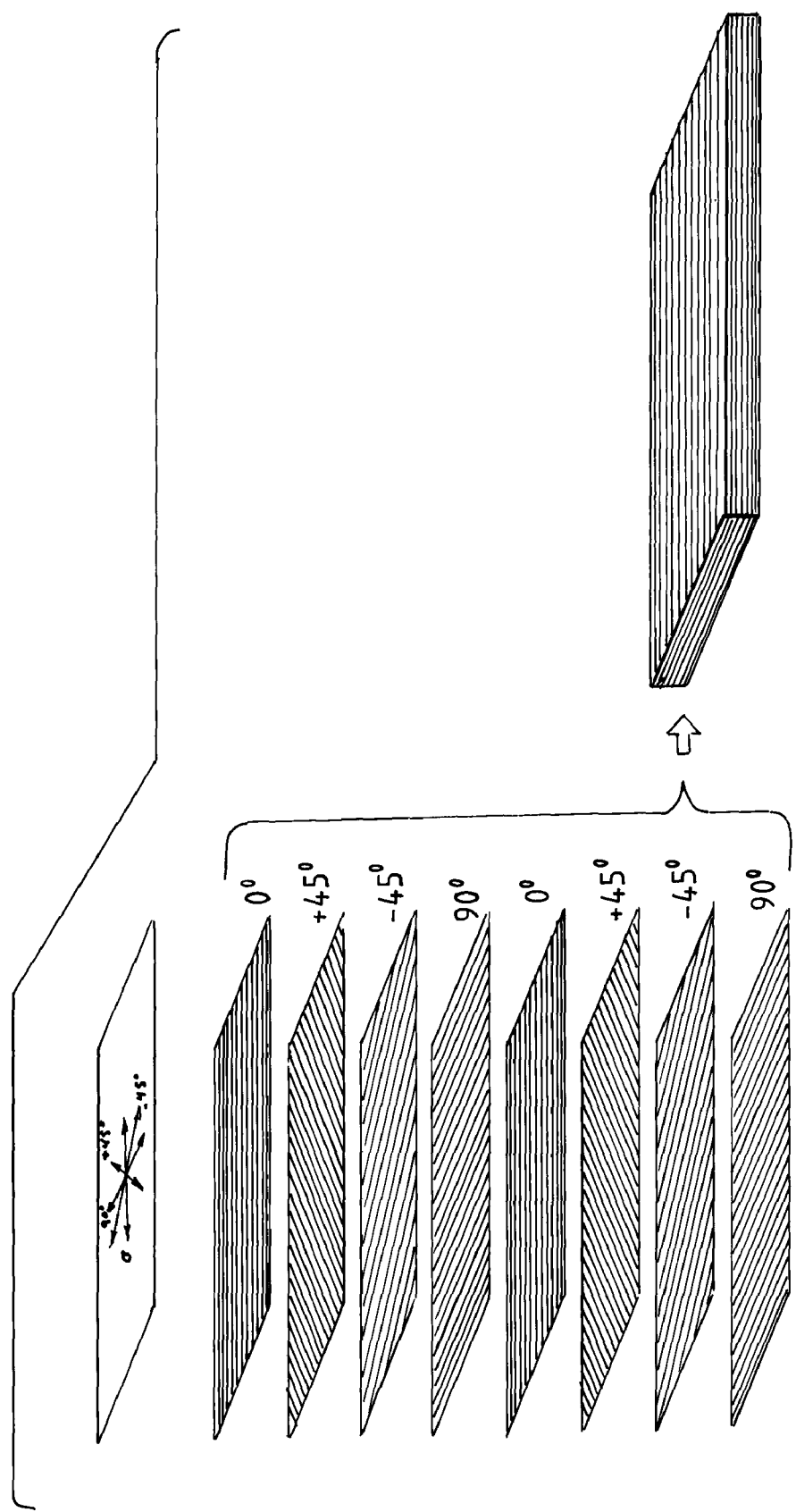
FIG. 8 is a flow schematic showing a preferred fiber orientation and layup schedule.

In keeping with the teachings of the foregoing embodiment, a unitary embodiment is shown in FIGS. 4 and 5. In this embodiment, handlebar 110 is formed using carbon fiber reinforced plastic construction to make a base bar 112. Forwardly facing arm extensions 114, 116 mate with integrally formed lugs 118, 120 in the base bar 112. The adjustability of the previous embodiment is advantageous for commercial production bars as purchasers can customize and adjust fit. For applications such as supplying an elite racing team, more finite adjustments can be tolerated and can be planned pre-race. Thus extensions 114, 116 can be custom cut to length for riders whose preferences are tested and known beforehand.

Lugs 118, 120 are formed integral with base bar 112 so that they each have a forwardly projecting cylindrical flange 122, 124 and a mating surface 126, 128 for improved bonding. This joint is preferably formed in a manner similar to U.S. Pat. Nos. 5,624,519 and 6,270,104, sharing a common assignee with this application. The disclosures in U.S. Pat. Nos. 5,624,519 and 6,270,104 are incorporated by reference as if fully set forth herein.

The arm extensions 114, 116 will be preferably formed of either carbon fiber reinforced plastic or aluminum. Other suitable materials could be used, for example, magnesium might be lighter than aluminum, or Kevlar reinforcing fibers might yield more desirable shock absorbing characteristics than all carbon.

Figure 2:
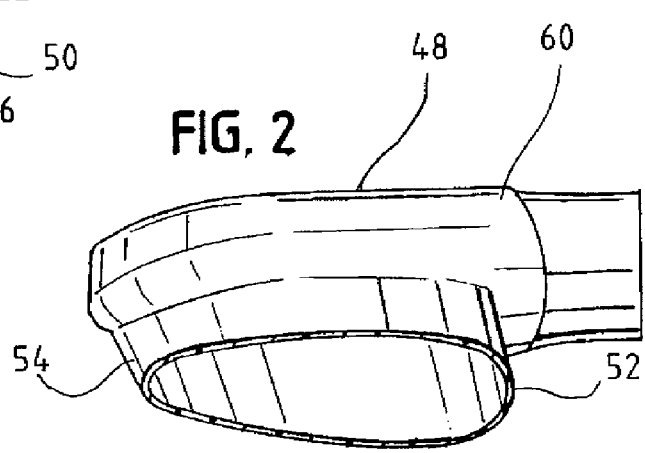
FIG. 2 is a sectional view of the blade.
Figure 3:
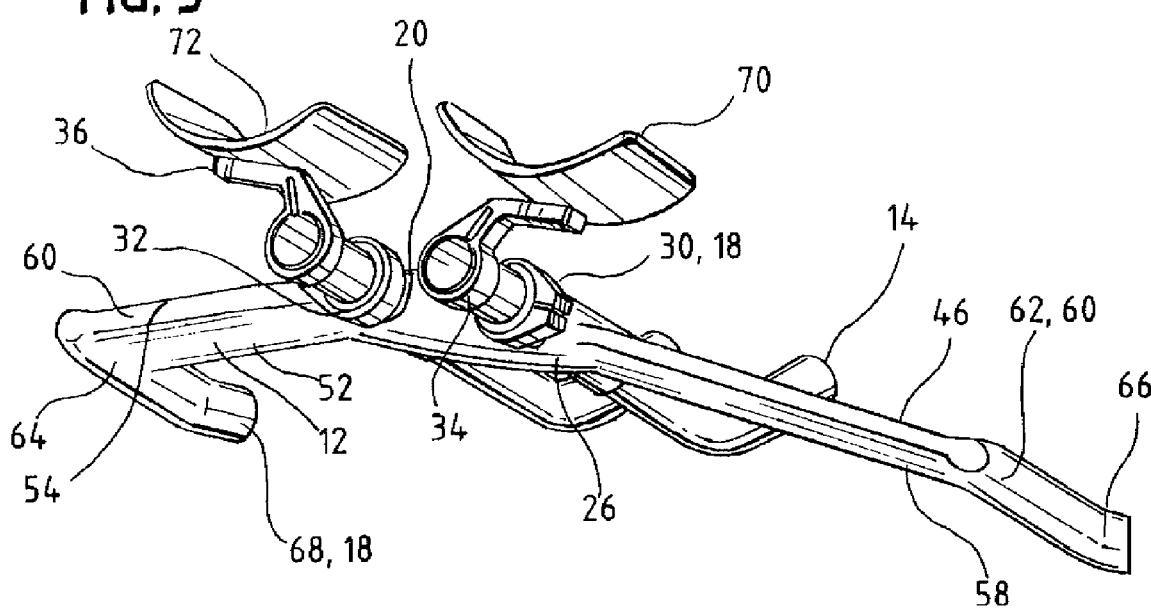
FIG. 3. is a rear perspective view of the unitary fiber reinforced plastic aerodynamic bicycle handlebar.

Arm pad spacers 134, 136 mount on base bar 112 as will be more fully described herein. In general shape, the base bar 112 has a cylindrical center portion 140 that is dimensioned to fit and is received in a standard handlebar stem (not shown). Center portion 140 merges into transition portions 142, 144 which connects the cylindrical portion 140 to tapered blades 146, 148. Blades 146, 148 each have the foil shape shown in FIG. 2.

The arm pad spacers 134, 136 are shaped to conform to the top surface of base bar 112, and particularly blades 146, 148. The height of spacers 134, 136 can be varied and the bars customized to the size and preference of particular riders. Blades 146, 148 terminate in grips 158, 160 which include forward facing cylindrical sections 162, 164 which can be used as handles. Arm pads 170, 172 can be fastened to spacers 134, 136.

In a preferred embodiment, handlebar 210 is formed using carbon fiber reinforced plastic construction to make a base bar 212. Forwardly facing arm extensions 214, 216 are received by integrally formed saddles 218, 220 in the base bar 212. This provides for adjustability of the bar so riders can customize and adjust fit. Saddles 218, 220 are formed integral with base bar 212.

The arm extensions 214, 216 will be preferably formed of either carbon fiber reinforced plastic. Other suitable materials could be used, for example, magnesium might be lighter than aluminum, or Kevlar reinforcing fibers might yield more desirable shock absorbing characteristics than all carbon.

Saddles 218, 220 co-act with seats 222, 224 on the underside of the compression portions 226, 228 of arm pad supports 234, 236 being bolted to base bar 212. In general shape, the base bar 212 has a cylindrical center portion 240 that is dimensioned to fit and is received in a standard handlebar stem (not shown). Center portion 240 merges into transition portions 242, 244 proximate saddles 218, 220. Blades 246, 248 each have the desired foil shape.

The arm pad supports 234, 236 are shaped to bolt to base bar 212

Blades 246, 248 terminate in grips 258, 260 which include forward facing cylindrical sections 262, 264 which can be used as handles. Arm pads 270, 272 can be fastened to supports 234, 236.

Bolts 280 are received in inserts 282 that are attached within the carbon reinforced plastic shell that defines base bar 212.

Figure 9:
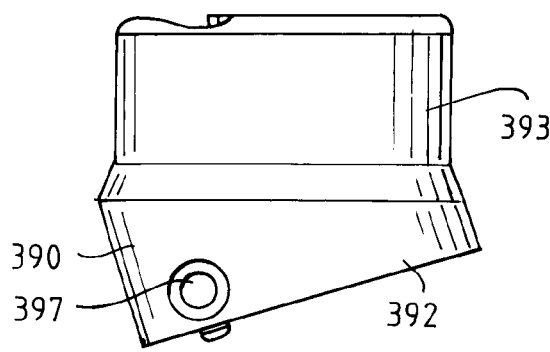
FIG. 9 is a right side elevational view of the preferred stem adapted to mount on a threadless fork steerer tube.
Figure 10:
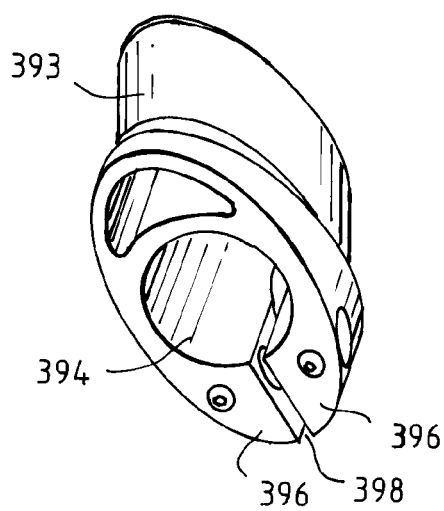
FIG. 10 is a left side, bottom perspective view of an inverted preferred stem adapted to mount on a threadless fork steerer tube.
Figure 11:
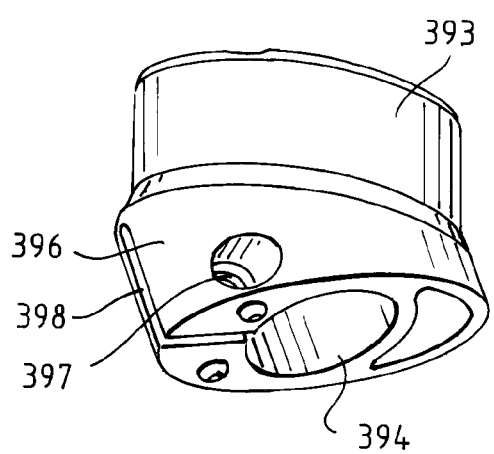
FIG. 11 is a right side, bottom perspective view of a preferred stem adapted to mount on a threadless fork steerer tube.
Figure 12:
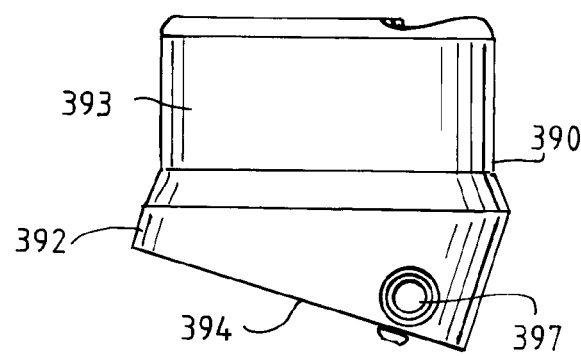
FIG. 12 is a left side elevational view of the preferred stem adapted to mount on a threadless fork steerer tube, with the stem inverted
Figure 13:
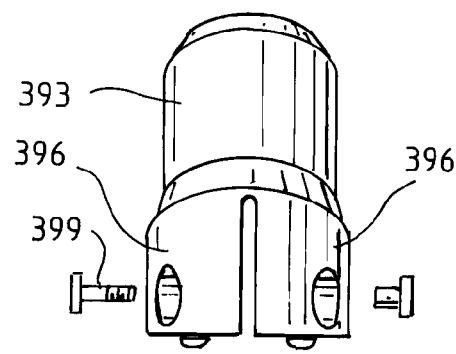
FIG. 13 is a rear side elevational view of the preferred stem adapted to mount on a threadless fork steerer tube.

FIG. 9 is a flow schematic illustrating a process that is utilized to construct uncured composite preforms or mats that are subsequently molded and precured as disclosed herein to produce the wheel of the invention. The specific properties of apparatus formed and the methods used are taught in U.S. Pat. Nos. 5,624,519 and 6,270,104 which are incorporated by reference as if fully set forth herein. The 0-45-90 degree orientation of unidirectional fiber preforms in multiple layer laminations permits forming a quasi-isotropic material having high strength to weight ratios and the use of optimum compaction, low void bladder molding in female molds permits fiber/area ratios in excess of 70%, approaching 90% or more.

Adaptation to utilize a bonded stem mountable on a selected one of the two customary bicycle fork steerer tubes enables a superior aerodynamic shape with improved weight and strength, while having fewer total components. While a particular bar requires a particular stem, for production purposes the unitary fiber reinforced plastic main bar can be made universal and bonded to the stem as needed.

FIG. 9-13 show the preferred stem 390 adapted to mount be bonded to handlebar 310 on a threadless fork steerer tube (not shown). Stem 390 has body 392 which terminates in an upwardly projecting plug 393 which engages handlebar 310 (FIG. 15) and fits in and is bonded to a receptacle described below.

Body 392 is formed to have a steerer tube receiving aperture 394. As shown, the aluminum stem 390 is machined or formed to have hollow walls that define aperture 394. However, alternative embodiments could utilize other materials and forming techniques, such as molding from a fiber reinforced plastic.

The rear of stem 390 is formed into opposed ears 396 having a bolt hole 397 spanning them the ears forming slot 398. Insertion and tightening of a bolt or other fastener 399 in hole 397 enables the clamping of stem 390 to the projecting steerer tube of a typical bicycle fork. One of ordinary skill in the art will understand that hole 397 can be appropriately formed with countersinking or even threading to receive the fastener. In this illustration a nut and bolt is shown.

Figure 15:
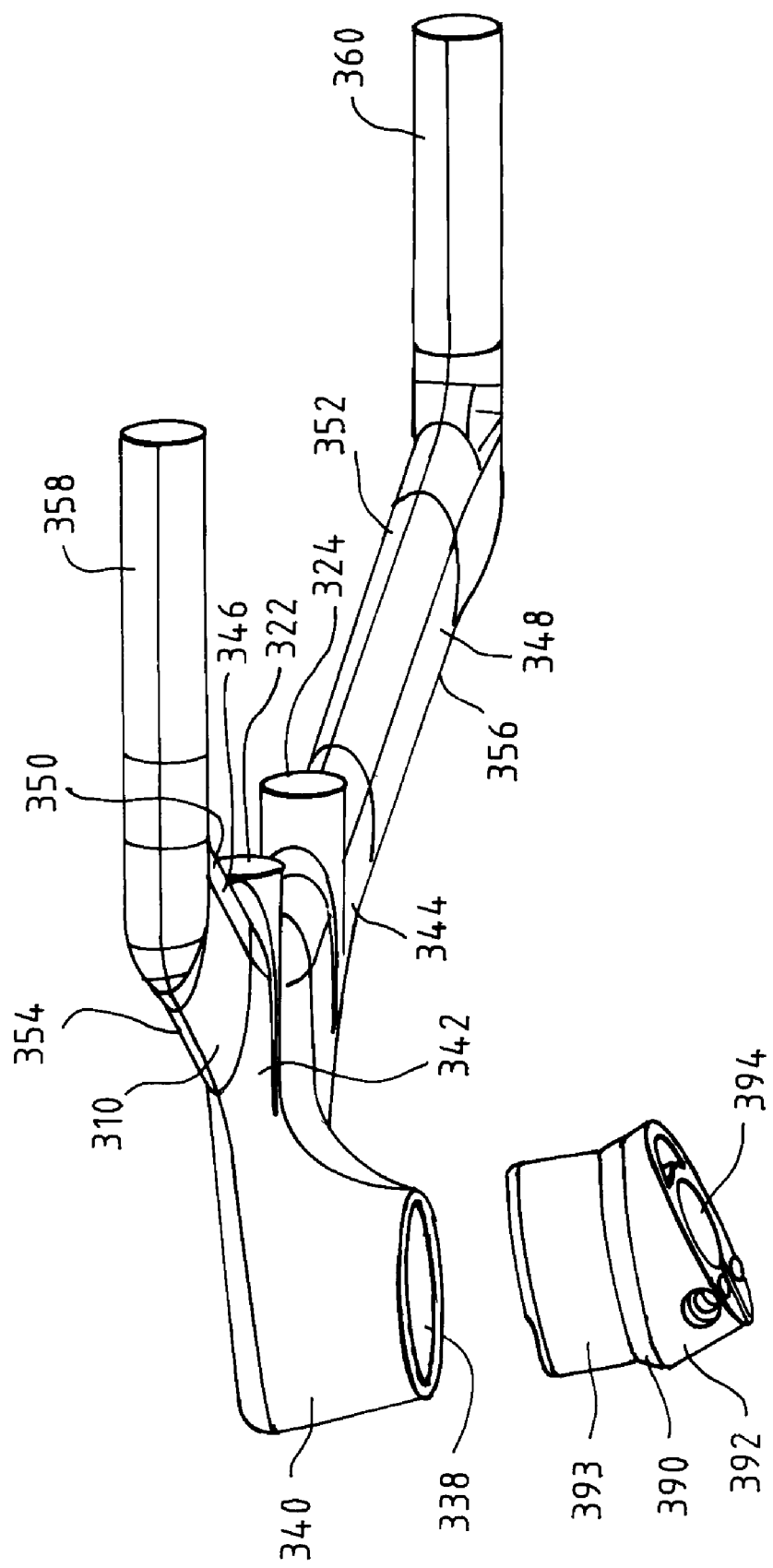
FIG. 15 is a right side, bottom perspective view of a handlebar of the invention embodiment of FIG. 14 with the stem adapted to mount on a threadless fork steerer tube visible but the collar omitted for clarity.

FIG. 15 shows stem 390 in relation to an improved one piece fiber reinforced plastic aerodynamic handlebar 310. This configuration uses bonded stem 390 and does away with cylindrical center portion 140 of the previously described alternative embodiment thereby having improved aerodynamics, with greater strength, potentially lower weight and fewer components. Stem 390 is received in a recess 338 in stem receiving center portion 340. With the more advantageous geometry the transition portions 342, 344 can provide greater support enabling tapered blades 346, 348 with a somewhat lower foil thickness between elliptical leading edges 350, 352 and trailing edges 354, 356 when compared to other embodiments. Blades 346, 348 end in grips 358, 360.

Figure 14:
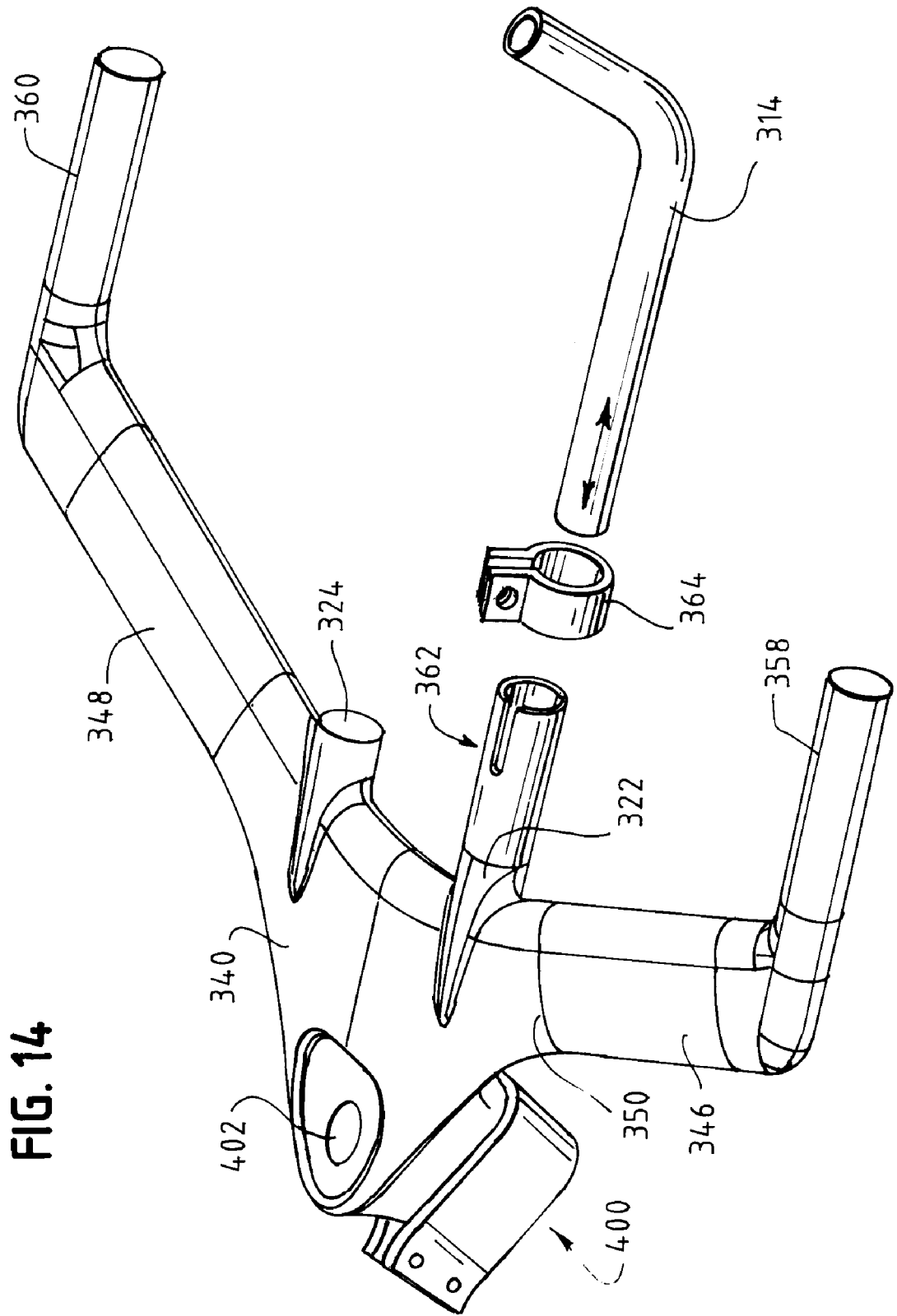
FIG. 14 is a right side, top perspective view of a handlebar of the invention with a fiber reinforced plastic clamping collar surrounding the stem adapted to mount on a fork steerer tube.

The handlebar extensions mount, as illustrated in FIG. 14, to projecting cylindrical flanges 322, 324. These could be molded to receive and clamp to bar extensions, one of which, 314, is shown in FIG. 14. Preferably, however, cylindrical extension sockets could be used, one of which is shown at 362, which receives clamp 364. The left side socket and extension would be identical.

FIG. 14 shows alternative stem arrangements. For example, a fiber reinforced plastic sleeve 400 could be used in lieu of stem 390. Additionally it will be noted that center portion 340 has a top aperture 402 which permits communication through portion 340 to the bicycle fork's steerer tube. This arrangement could be utilized either for access to the threadless headset's tensioning adjustment, or to an adapter enabling mounting analogous to a more traditional "quill" style stem in which the adapter has a wedge which expands outwardly against the steerer tube. The adapter could be integral with stem 390 or could be a separate component.

While several embodiments have been shown and described with respect to the present invention, it should be understood that the present invention is not limited to these embodiments, but rather is susceptible to numerous changes and modifications as known to those skilled in the art. Therefore, we do not wish to be limited to the detail shown and described herein, and intend to cover all such changes and modifications as are encompassed by the scope of such claims as may be allowed.

We claim:

1. A unitary bicycle handlebar assembly comprising:
    a base bar having a center portion and a pair of tapered portions;
    the center portion having a first end and a second end and is adapted to be removably connected to a handlebar stem;
    the tapered portions extending outwardly from the first and second ends of the center portion and having a pair of forwardly projecting hand grips at each end of each tapered portion, spaced from and in substantially the same plane as the center portion;
    said center portion having an extension bar receiving recess formed therein;
    a clamp member adjustably connected to the base bar substantially proximate the first and second ends of the center portion;
    the clamp member adapted to receive an extension bar capturing the extension bar between the member and the recess, wherein the extension bar is in substantially the same plane as said grips, and said extension bar may be adjusted in a forward or rearward manner relative to the center portion;
    an arm support connected to the clamp member;
    said center portion being configured to receive the handlebar stem of a type being one of a threadless headset stem which captures the center portion by clamping and captures a steer tube by clamping or an integral stem which is bondingly received by the center portion and captures the steer tube by clamping.

2. A unitary carbon fiber aerodynamic bicycle handlebar assembly comprising:
    a base bar having a tubular center portion and an elliptical tapered end portion;

the center portion having a first end and a second end and a top side and a bottom side, and is adapted to be removably connected to a handlebar stem;

the tapered portions extending outwardly from the first and second ends of the center portion and having a hand grip opposing the center portion, wherein the hand grip projects forward relative to, and in substantially the same plane as, the position of the tapered portions;

the base bar having a recess formed on a top surface substantially proximate the first and second ends of the center portion;

a clamp member adjustably connected to the base bar and is adapted to receive an extension bar wherein the extension bar is located between the recess and the clamp member;

the extension bar having a first end and a second end, wherein the extension bar is bent upward at the first end and the second end is received through the combination of clamp member and recess coactinq with one another to capture said second end;

an arm support connected to the clamp member;

said center portion being configured to receive the stem of a threadless headset stem which captures the center portion by clamping.

3. The handlebar assembly of claim 2 further comprising:

a pair of forwardly facing arm extension bars connectable to a said base bar;

means for attaching the arm extension bars in place on the base bar to form an aerodynamic bar assembly;

a pair of arm pads mountable to the means for attaching;

means for mounting a pair of arm pads to the means for attaching;

the base bar has a cylindrical center portion that is dimensioned to fit a threadless handlebar stem, a transition portion connects the cylindrical portion to tapered blades that have an elliptical leading and trailing edge;

the arm extension bars are positioned on the cylindrical center portion, just inside the transition from cylindrical to blade shapes;

the blades terminate in forward facing cylindrical section, formed to have upwardly curved handles.

4. The handlebar assembly according to claim 3, wherein the assembly is made of carbon fiber, reinforced plastic, aluminum or Kevlar reinforcing fibers.

5. The handlebar assembly according to claim 4, wherein the base bar is hollow.

6. The handlebar assembly according to claim 5, wherein said assembly is formed of a lamination of a plurality unidirectional fiber layers;

said lamination comprises at least eight layers with said fibers oriented in a repetition of 0-45-90 degree orientation to comprise a finished assembly.

7. A unitary bicycle handlebar assembly comprising:

a base bar having a center portion and a pair of tapered portions;

the center portion having a first end and a second end and is adapted to be removably connected to a handlebar stem;

the tapered portions extending outwardly from the first and second ends of the center portion and having a pair of forwardly projecting hand grips at each end of each tapered portion, spaced from and in substantially the same plane as the center portion;

said center portion having an extension bar receiving recess formed therein;

a clamp member adjustably connected to the base bar substantially proximate the first and second ends of the center portion;

the clamp member adapted to receive an extension bar, capturing the extension bar between the member and the recess, wherein the extension bar is in substantially the same plane as said grips, and said extension bar may be adjusted in a forward or rearward manner relative to the center portion;

an arm support connected to the clamp member;

said center portion being configured to receive a threadless headset stem which captures the center portion by clamping and captures a steer tube by clamping.

* * * * *